United States Patent
Lacroix (10) Patent No.: US 12,253,222 B2
(45) Date of Patent: Mar. 18, 2025

(54) MULTI-COLOR MIXING AND SHAPING OPTIC AND SYSTEM

(71) Applicant: SIGNIFY HOLDING B.V., Eindhoven (NL)

(72) Inventor: Luc Guy Louis Lacroix, Groton, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/566,697

(22) PCT Filed: May 20, 2022

(86) PCT No.: PCT/EP2022/063803
§ 371 (c)(1),
(2) Date: Dec. 4, 2023

(87) PCT Pub. No.: WO2022/253601
PCT Pub. Date: Dec. 8, 2022

(65) Prior Publication Data
US 2024/0200733 A1   Jun. 20, 2024

Related U.S. Application Data

(60) Provisional application No. 63/196,733, filed on Jun. 4, 2021.

(30) Foreign Application Priority Data

Jun. 15, 2021   (EP) ..................................... 21179381

(51) Int. Cl.
*F21K 9/62*   (2016.01)
*F21K 9/61*   (2016.01)
(Continued)

(52) U.S. Cl.
CPC .................. *F21K 9/62* (2016.08); *F21K 9/61* (2016.08); *F21V 7/0091* (2013.01); *F21Y 2115/10* (2016.08)

(58) Field of Classification Search
CPC ............. F21K 9/62; F21K 9/61; F21V 7/0091
See application file for complete search history.

(56) References Cited

U.S. PATENT DOCUMENTS

9,010,982 B2* 4/2015 Kropac ................ G02B 6/0018
                                                          362/249.02
9,206,956 B2* 12/2015 Speier .................... F21V 7/0016
(Continued)

*Primary Examiner* — Bryon T Gyllstrom (57) ABSTRACT

A mixing and shaping system with a mixing and shaping optic is provided. The system can include an optical housing configured to secure the optic along with a diffuser component arranged between the optic and the exit lens of the optical housing. The optic includes an integrally formed mixing pipe and reflector body configured to mix and shape radiation for superior near field and far field mixing. The mixing pipe is optically coupled to one or more radiation sources. The reflector body includes a first internal surface configured to receive the radiation from the one or more radiation sources and reflect or refract the radiation, and a second internal surface configured to receive the reflected radiation and reflect or refract the radiation, wherein at least a portion of the reflected radiation is configured to exit the reflector body through the first internal surface.

13 Claims, 5 Drawing Sheets

(51) Int. Cl.
*F21V 7/00* (2006.01)
*F21Y 115/10* (2016.01)

(56) References Cited

U.S. PATENT DOCUMENTS

| | | | |
|---|---|---|---|
| 9,354,377 B2* | 5/2016 | York | G02B 6/0055 |
| 9,746,596 B2* | 8/2017 | Preston | F21V 7/0091 |
| 2005/0265044 A1* | 12/2005 | Chen | G02B 6/0028 |
| | | | 362/558 |
| 2006/0077685 A1 | 4/2006 | Hsieh et al. | |
| 2006/0164839 A1 | 7/2006 | Stefanov | |
| 2007/0263383 A1* | 11/2007 | Ansems | G02B 6/0021 |
| | | | 362/231 |
| 2009/0121238 A1 | 5/2009 | Peck | |
| 2009/0219716 A1 | 9/2009 | Weaver et al. | |
| 2012/0026748 A1* | 2/2012 | Boonekamp | F21V 3/0615 |
| | | | 362/551 |
| 2013/0258699 A1* | 10/2013 | Weaver | F21K 9/62 |
| | | | 362/555 |
| 2013/0272015 A1 | 10/2013 | Weaver | |
| 2018/0284339 A1 | 10/2018 | Isbrucker et al. | |

* cited by examiner

MULTI-COLOR MIXING AND SHAPING OPTIC AND SYSTEM

CROSS-REFERENCE TO PRIOR APPLICATIONS

This application is the U.S. National Phase application under 35 U.S.C. § 371 of International Application No. PCT/EP2022/063803, filed on May 20, 2022, which claims the benefit of U.S. Provisional Patent Application No. 63/196,733, filed on Jun. 4, 2021 and European Patent Application Ser. No. 21179381.5, filed on Jun. 15, 2021. These applications are hereby incorporated by reference herein.

FIELD OF THE DISCLOSURE

The present disclosure is directed generally to color mixing and shaping, specifically, light mixing and shaping optics and systems using total internal reflectance.

BACKGROUND

Color mixing of artificial light typically involves a mixing chamber used to reflect or refract light generated from a single point source, and redistribute that light within the mixing chamber such that when the light leaves the mixing chamber, the rendered image of the light is substantially homogenous, i.e., does not include artifacts of multiple color sources from the single point source. Typical color mixing chambers are coupled with a Koehler integrator to evenly spread a given spectrum or source illumination over a field of view or image to mix the light. Other applications utilize mixing rods or pipes made of glass or silicon to mix light prior to allowing the light to proceed to a target for illumination. Both of these methods suffer from poor efficiency or poor near field mixing.

In addition to mixing the light produced, some systems utilize an additional body for shaping the mixed light. Examples that use a separable shaping optic to shape the mixed light typically suffer loses or suffer from alignment issues with the mixing chamber and result in poor near field and far field mixing.

SUMMARY OF THE DISCLOSURE

The present disclosure is related to a mixing and shaping system with a mixing and shaping optic. The system can include an optical housing configured to secure the optic along with a diffuser component arranged between the optic and the exit lens of the optical housing. The optic includes an integrally formed mixing pipe and reflector body configured to mix and shape radiation for superior near field and far field mixing. The mixing pipe is optically coupled to one or more radiation sources. The reflector body includes a first internal surface configured to receive the radiation from the one or more radiation sources and reflect or refract the radiation, and a second internal surface configured to receive the reflected radiation and reflect or refract the radiation, wherein at least a portion of the reflected radiation is configured to exit the reflector body through the first internal surface.

The optic of the present disclosure provides several distinct advantages. First, by mixing the radiation within the mixing pipe and providing further mixing and shaping through the reflectance provided between the first interior surface and second interior surface prior to allowing the radiation to exit the optic, the optic will emit radiation with superior near field and far field mixing of the radiation with no hot spots or chromatic aberrations. Second, the optic does not include a dedicated exit surface, e.g., the first interior surface is both a reflective surface to aid in mixing and shaping and also acts as an exit surface for the mixed and shaped light to exit the optic. By utilizing the first interior surface for this dual purpose, more surface area can be utilized to emit the mixed and shaped light resulting in superior near field and far field mixing. Third, when used in a mixing and shaping system, e.g., a system that includes an optical housing as well as a diffuser component between the optic and the exit lens of the optical housing, the diffuser component will further diffuse and smooth out the radiation emitted by the optic to further mitigate any undesirable shaping effects generated by the shape of the mixing pipe. Finally, by producing the mixing pipe and the reflector body as one single integral article, the ability and cost of manufacturing optic can be reduced.

In an example, an optic for mixing and shaping electromagnetic radiation is provided, the optic including a mixing pipe optically coupled to one or more radiation sources, the one or more radiation sources configured to generate electromagnetic radiation; and a reflector body integrally secured to the mixing pipe, the reflector body comprising a first internal surface configured to receive the electromagnetic radiation from the one or more radiation sources and reflect or refract the electromagnetic radiation as reflected electromagnetic radiation, and a second internal surface configured to receive the reflected electromagnetic radiation and reflect or refract the reflected electromagnetic radiation; wherein at least a portion of the reflected electromagnetic radiation is configured to exit the reflector body through the first internal surface.

In an aspect, the one or more radiation sources are Light Emitting Diodes (LEDs) or Color LEDs.

In an aspect, the reflector body is formed with a body material where the body material is polycarbonate.

In an aspect, a portion of the first internal surface of the reflector body comprises a first reflective material.

In an aspect, the portion of the first internal surface that comprises the first reflective material includes a portion of the first internal surface proximate an imaginary optical axis arranged through the mixing pipe and the reflector body and substantially concentric with the reflector body.

In an aspect, the second internal surface of the reflector body comprises a second reflective material.

In an aspect, the second reflective material is disposed along the entire second internal surface.

In an aspect, the mixing pipe has a cross-sectional profile, wherein the cross-sectional profile is selected from at least one of: square, circular, hexagonal, and octagonal.

In another example, an optical system for mixing and shaping electromagnetic radiation is provided, the system including an optical housing; a diffuser component; and an optic. The optic including: a mixing pipe optically coupled to one or more radiation sources, the one or more radiation sources configured to generate electromagnetic radiation; and a reflector body integrally secured to the mixing pipe, the reflector body comprising a first internal surface configured to receive the electromagnetic radiation from the one or more radiation sources and reflect or refract the electromagnetic radiation as reflected electromagnetic radiation, and a second internal surface configured to receive the reflected electromagnetic radiation and reflect or refract the reflected electromagnetic radiation; wherein at least a portion of the reflected electromagnetic radiation is configured to exit the reflector body through the first internal surface, and wherein the reflected electromagnetic radiation that exits the reflector body is configured to pass through the diffuser component into a surrounding environment.

In an aspect, the one or more radiation sources are Light Emitting Diodes (LEDs) or Color LEDs.

In an aspect, the reflector body is formed with a body material where the body material is polycarbonate.

In an aspect, a portion of the first internal surface of the reflector body comprises a first reflective material.

In an aspect, the portion of the first internal surface that comprises the first reflective material includes a portion of the first internal surface proximate an imaginary optical axis arranged through the mixing pipe and the reflector body and substantially concentric with the reflector body.

In an aspect, the second internal surface of the reflector body comprises a second reflective material and wherein the second reflective material is disposed along the entire second internal surface.

In an aspect, the mixing pipe has a cross-sectional profile, wherein the cross-sectional profile is selected from at least one of: square, circular, hexagonal, and octagonal. These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is related to a mixing and shaping system with a mixing and shaping optic. The system can include an optical housing configured to secure the optic along with a diffuser component arranged between the optic and the exit lens of the optical housing. The optic includes an integrally formed mixing pipe and reflector body configured to mix and shape radiation for superior near field and far field mixing. The mixing pipe is optically coupled to one or more radiation sources. The reflector body includes a first internal surface configured to receive the radiation from the one or more radiation sources and reflect or refract the radiation, and a second internal surface configured to receive the reflected radiation and reflect or refract the radiation, wherein at least a portion of the reflected radiation is configured to exit the reflector body through the first internal surface.

The optic of the present disclosure provides several distinct advantages. First, by mixing the radiation within the mixing pipe and providing further mixing and shaping through the reflectance provided between the first interior surface and second interior surface prior to allowing the radiation to exit the optic, the optic will emit radiation with superior near field and far field mixing of the radiation with no hot spots or chromatic aberrations. Second, the optic does not include a dedicated exit surface, e.g., the first interior surface is both a reflective surface to aid in mixing and shaping and also acts as an exit surface for the mixed and shaped light to exit the optic. By utilizing the first interior surface for this dual purpose, more surface area can be utilized to emit the mixed and shaped light resulting in superior near field and far field mixing. Third, when used in a mixing and shaping system, e.g., a system that includes an optical housing as well as a diffuser component between the optic and the exit lens of the optical housing, the diffuser component will further diffuse and smooth out the radiation emitted by the optic to further mitigate any undesirable shaping effects generated by the shape of the mixing pipe. Finally, by producing the mixing pipe and the reflector body as one single integral article, the ability and cost of manufacturing optic can be reduced.

Figure 1:
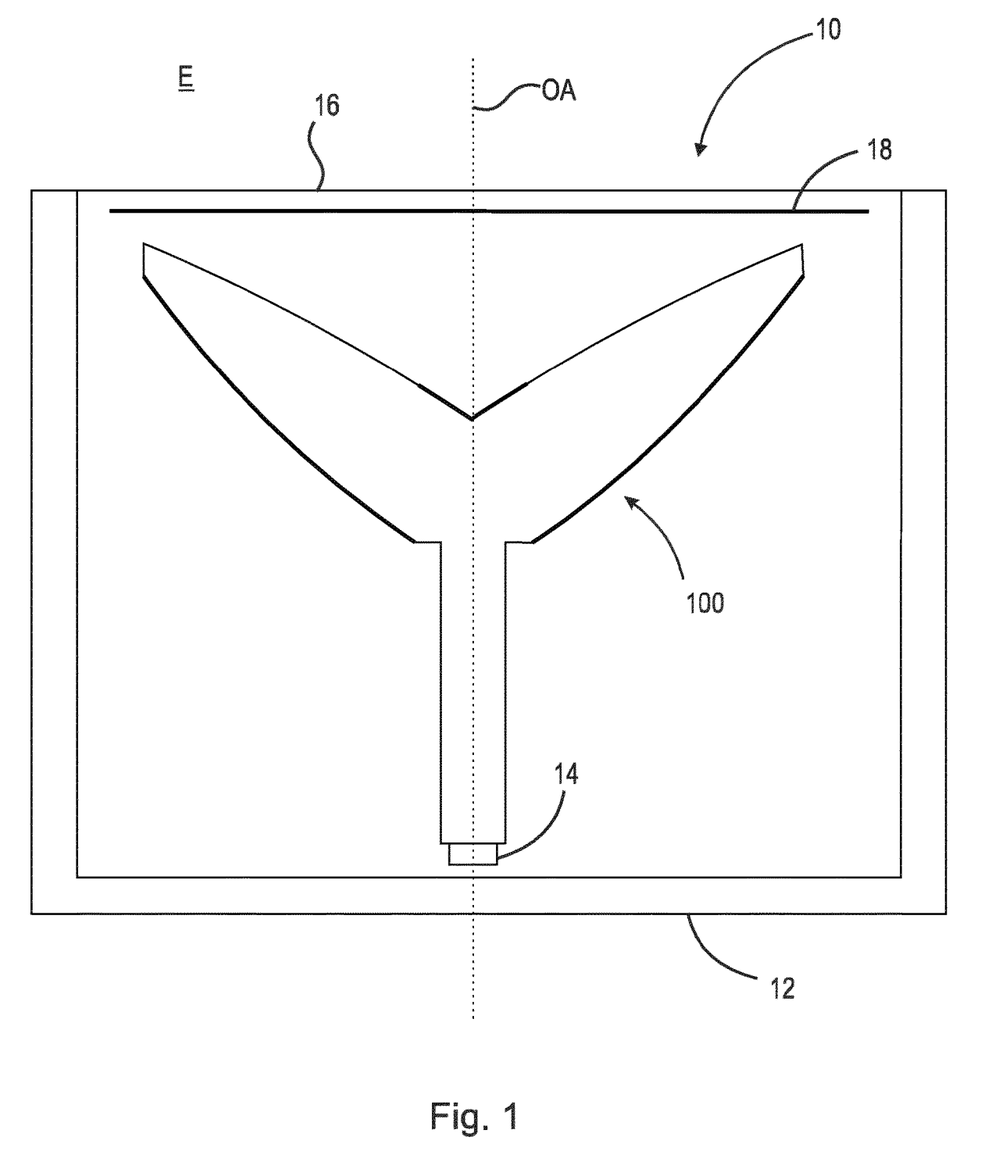
FIG. 1 is side-elevational schematic representation of a color mixing and shaping system according to the present disclosure.

The following description should be read in view of FIGS. 1-5B. FIG. 1 illustrates a side elevational schematic view of a mixing and shaping system 10 according to the present disclosure. As shown, system 10 includes an optical housing 12 configured to at least partially encompass a color mixing and shaping optic 100 (discussed below), one or more radiation sources 14 configured to generate or emit electromagnetic radiation ER (hereinafter referred to as "radiation ER"), an exit lens 16, and a diffuser component 18. In some examples, optical housing 12 is a luminaire housing or other light fixture housing that is configured to secure one or more sources 14 of electromagnetic radiation ER (hereinafter referred to as "radiation sources 14"), e.g., visible light sources such as Light-Emitting Diodes (LEDs) or clusters of LEDs. In some examples, radiation sources 14 can include LEDs that can vary in the portion of electromagnetic radiation ER they are arranged to emit, e.g., a cluster of 4-colored LEDs where one LED in the cluster emits electromagnetic radiation ER in the red spectrum, one LED in the cluster emits electromagnetic radiation in the blue spectrum, one LED in the cluster emits electromagnetic radiation in the green spectrum, and one LED in the cluster is arranged to emit a combination of electromagnetic radiation in the red, blue, and green spectrums substantially forming white light. It should be appreciated that various LEDs may be utilized, for example, Organic LEDs, phosphor-based LEDs, etc. In addition to or in the alternative to producing radiation in the visible range of the electromagnetic radiation spectrum, it should be appreciated that radiation sources 14 can also be configured to produce or emit radiation in portions of the electromagnetic radiation spectrum that are not visible to the human eye, e.g., ultraviolet, infrared, etc.

In the example shown in FIG. 1, system 10 includes an exit lens 16 arranged at the exterior of optical housing 12 and along an imaginary optical axis OA of the mixing and shaping optic 100 (discussed below). Between optic 100 and exit lens 16, system 10 can include a diffuser component 18 configured to receive radiation, e.g., radiation ER or reflected radiation RR (discussed below), from optic 100 and diffuse or slightly mix that radiation prior to the radiation ER being projected through the exit lens 16 and into the surrounding environment E. It should be appreciated that the diffusing component can contain a surface texture, e.g., similar to that of a Fresnel lens, to aid in diffusing the image produced by optic 100 and providing superior near field and far field mixing and shaping as will be discussed herein. In addition to being a discrete component positioned between exit lens 16 and optic 100, it should be appreciated that exit lens 16 can be coated with a diffusing material configured to further mix the image generated by optic 100.

Figure 2:
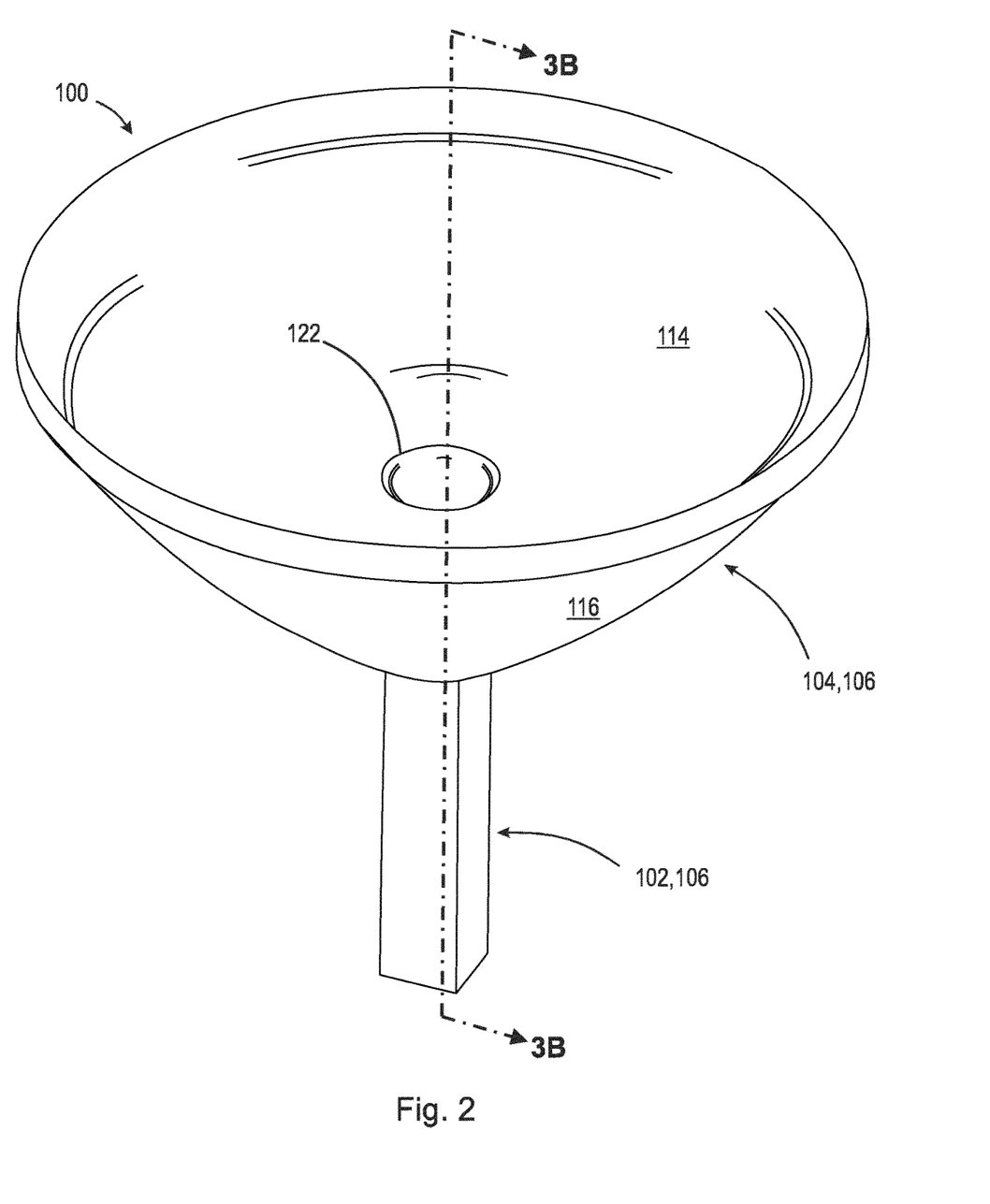
FIG. 2 is top-perspective schematic representation of a color mixing and shaping optic according to the present disclosure.

As mentioned above, and as illustrated in FIGS. 1-5B, system 10 also includes a color mixing and shaping optic 100 (referred to herein as "optic 100"). FIG. 2 illustrates a perspective view of optic 100 in isolation for clarity. As illustrated, optic 100 comprises a mixing pipe 102 and a reflector body 104. In some examples, as illustrated in FIG. 2, mixing pipe 102 and reflector body 104 are integrally formed, e.g., they are formed as a single component or article. In some examples, mixing pipe 102 and reflector body 104 are formed in an injection molding process and can be made from a body material 106, e.g., silicon, glass, Poly(methyl methacrylate) (PMMA), Polycarbonate (PC), or other transparent or translucent polymers. As will be discussed below, in some examples, the body material 106 is Polycarbonate to allow for successful integration, impregnation, or adhesion with coating materials, e.g., first reflective material 122 or second reflective material 124 (both discussed below). Furthermore, although illustrated as solid article in FIGS. 3A and 3B, it should be appreciated that optic 100 can be formed as a hollow article with similarly shaped and positioned surfaces. It should also be appreciated that although illustrated as a single article, i.e., an integrally formed combination, mixing pipe 102 and reflector body 104 can be formed or molded as two separate components and adhered to and/or aligned with each other to achieve the functionality described herein. It should be appreciated that forming the mixing pipe 102 and reflector body 104 as separate components may be undesirable in that precisely aligning the reflector body 104 with the mixing pipe 102 can be difficult, and any gap between the two components will cause diffraction and/or refraction and generate slight inefficiencies in the light transmission from the mixing pipe 102 and the reflector body 104.

As illustrated in FIGS. 1-5B, mixing pipe 102 is formed as a substantially rectangular member disposed longitudinally along optical axis OA. FIG. 3A is one example of a cross-sectional view of optic 100. As shown in FIG. 3A, mixing pipe 102 includes a bottom surface 108, one or more interior pipe surfaces 110, and a transition portion 112. Bottom surface 108 is a substantially planar surface configured to receive radiation from the one or more radiation sources 14. In other words, bottom surface 108 is optically coupled to the one or more radiation sources 14 such that radiation generated from those sources is received by bottom surface 108 and transmitted or refracted into mixing pipe 102. In the example described herein, radiation sources 14 are positioned proximate bottom surface 108 such that an small air gap exists between radiation sources 14 and bottom surface 108; however, it should be appreciated that, in other examples (not shown), radiation sources can be secured or fused directly to bottom surface 108, e.g., with a transparent adhesive or other methods. Thus, bottom surface 108 receives the initial electromagnetic radiation ER from the one or more radiation sources 14. Once within mixing pipe 102, radiation ER will spread at various angles from the point source radiation sources 14 and contact and reflect off of the one or more interior pipe surfaces 110, e.g., the interior surfaces formed by the elongated rectangular walls of mixing pipe 102. Depending on the emission angle of radiation ER produced by radiation sources 14, the radiation ER will proceed from bottom surface 108 to transition portion 112. In the event the initial emission angle of a given radiation ray is small with respect to optical axis, e.g., plus or minus 5-10 degrees, the ray will proceed from bottom surface 108 to transition portion 112 without contacting the one or more interior pipe surfaces 110. However, should the initial emission angle of the rays of radiation be large with respect to optical axis OA, e.g., plus or minus 10-89 degrees, the rays will reflect off one or more interior surfaces 110 in their procession from bottom surface 108 to transition portion 112. It should be appreciated that at larger angles with respect to optical axis OA, e.g., 45 degrees, the radiation rays will reflect off two or more interior pipe surfaces 110 as they proceed from bottom surface 108 to transition portion 112. The reflecting and mixing of these rays as the rays proceed from bottom surface 108 to transition portion 112 cause the light produced to mix and reduce hot spots in the image produced at least at the transition portion 112. Although illustrated as a rectangular member, e.g., a member with a square cross-sectional profile, it should be appreciated that other shapes can be utilized for mixing pipe 102. For example, mixing pipe 102 may be have a circular, hexagonal, or octagonal cross-sectional profile, such that mixing pipe 102 is formed substantially as an extruded circle (e.g., a cylinder), and extruded hexagon or extruded octagon, etc. In the example provided, the rectangular member (with a square cross-sectional profile) will produce an image through optic 100 that is substantially square, i.e., may have sharp defined edges. By embedding or securing optic 100 within optical housing 12 (described above) and providing a diffuser component 18 between optic 100 and exit lens 16, the square shape of the image produced by the mixing pipe with a square cross-sectional profile can be mitigated and/or eliminated prior to allowing the radiation to exit optical housing 12.

Although not illustrated, in examples where mixing pipe 102 is a separately formed component from reflector body 104, transition portion 112 marks the zone or area between the top (e.g., the portion of mixing pipe 102 arranged on the opposing side of mixing pipe 102 with respect to bottom surface 108) surface of mixing pipe 102 and the lower surface of the reflector body 104. In the examples illustrated herein, e.g., where mixing pipe 102 and reflector body 104 are integrally formed as a single article, transition portion 112 marks an imaginary line or region where the top of mixing pipe 102 transitions to the reflector body 104.

Figure 3A:
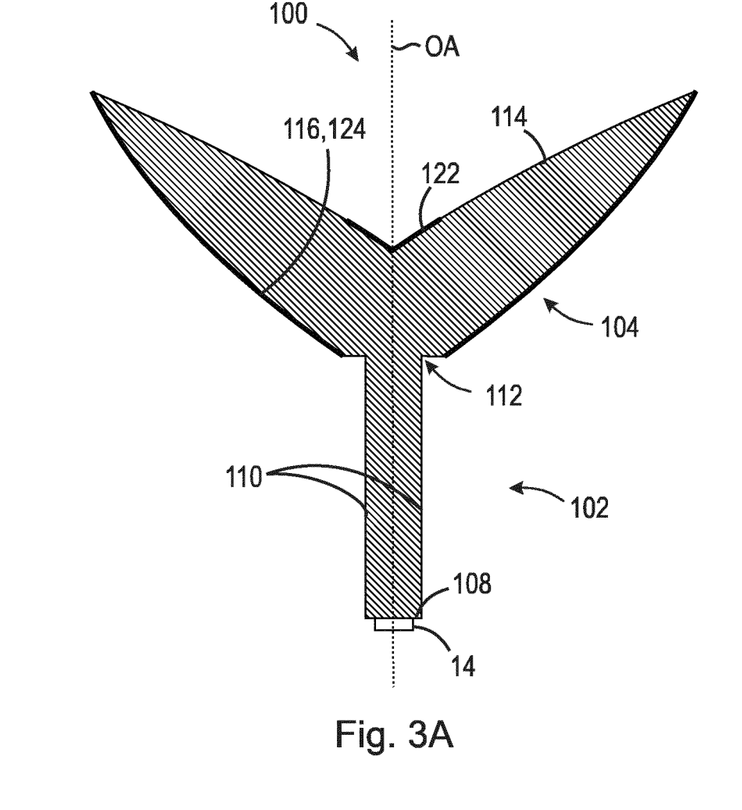
FIG. 3A is a side cross-sectional view of an optic according to the present disclosure.

As shown in FIG. 3A, reflector body 104 includes at least two internal surfaces, e.g., first internal surface 114 and second internal surface 116. As illustrated in FIGS. 3A-5B, first internal surface 114 is intended to be the internal surface formed at the transition between the solid interior of reflector body 104 and the air positioned above and outside of optic 100. Second interior surface 116 is intended to be the internal surface formed at the transition between the solid interior of reflector body 104 and the air positioned below and outside of optic 100. First interior surface 114 is intended to be a substantially planar surface, i.e., a surface with no curvature and is arranged at an angle with respect to optical axis OA such that first interior surface 114 flares radially outward from the portion proximate optical axis OA and the portion that connects with second interior surface 116. This radially outward taper results in first interior surface 114 with a cross-sectional profile in the shape of a "V" and when symmetrically and radially formed, results in a surface that substantially forms the shape of an inverted cone. Second interior surface 116 is intended to be a curved surface extending from proximate the transition portion 112 to the portion of optic 100 that connects with first interior surface 114. As will be discussed below in detail, it is intended that a substantial portion of the mixed radiation ER provided through transition portion 112 of mixing pipe 102 is received by first interior surface 114 and reflected to second interior surface 116 which is then reflected back to first interior surface 114 at an angle of incidence that is less than the critical angle for total internal reflectance such that the reflected radiation is emitted through first interior surface 114 and into the environment E surrounding optic 100. In some examples, and although not illustrated, first interior surface 114 and second interior surface can include a first plurality of radially disposed splines and a second plurality of radially disposed splines, respectively, configured to receive reflected radiation and further mix or refract the radiation prior to exiting exit lens 16.

Figure 3B:
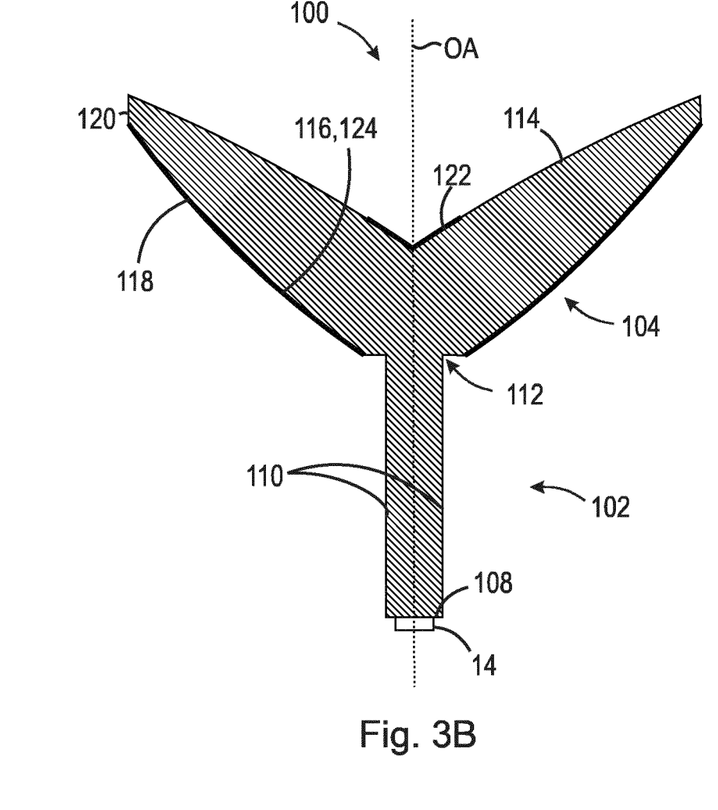
FIG. 3B is a side cross-sectional view of the optic illustrated in FIG. 2, taken generally along line 3B-3B in FIG. 2.

FIG. 3B illustrates a cross-section view of optic 100, taken generally along line 3B-3B in FIG. 2, where first internal surface 114 remains substantially planar, while second internal surface 116 is divided into two portions, a curved portion 118 and a vertically planar portion 120. As shown, this alternative example arrangement results in a blunted tip or blunted outer edge where the first interior surface 114 and the second interior surface 116 meet, resulting in a simpler and more structurally sound shape that is easier to mold through the injection molding process. It should be appreciated that these two portions are described as curved and vertically planar with respect to their cross-sectional representations and that these surfaces are rotationally symmetrical around optical axis in 360 degrees.

Additionally, optic 100 can include one or more portions of reflective material to aid in generating reflected radiation where the incident radiation on a given surface would be below the critical angle for internal reflectance. For example, a portion of first interior surface 114 can include a first reflective material 122 and at least a portion of second interior surface 116 can include a second reflective material 124. First reflective material 122 and second reflective material 124 can be selected from Aluminum, Aluminum Oxide, Silver, or Gold, and are intended to reflect 80%-96% if the radiation that contacts these materials. In some examples, first reflective material 122 and second reflective material 124 is an aluminum mirror coating material with 80%-90% reflectivity that is integrated or impregnated within the body material 106 of reflector body 104. As mentioned above, aluminum adheres well with Polycarbonate (PC) materials, thus, in one example, body material 106 is Polycarbonate, while first reflective material 122 and second reflective material 124 include aluminum.

Importantly, only a portion of first interior surface 114 includes the first reflective material 122. As illustrated in FIGS. 3A-5B, only the portion of first interior surface 114 that is proximate the optical axis OA includes the first reflective material 122. For example, the portion of first interior surface 114 that includes first reflective material 122 is the portion that will receive a substantial portion of radiation rays at an angle less than the critical angle for total internal reflection. For example, this angle may be selected from an angle that is plus or minus 5-35 degrees with respect to the optical axis OA such that only the portion within that angle includes the first reflective material 122. Said another way, the portion of first reflective surface 114 that does not include first reflective material 122 will receive rays of radiation that will have an angle of incidence that is greater than the critical angle for total internal reflectance and does not need assistance in reflecting the rays of radiation that the reflective material would provide. Once the radiation is reflected off of first interior surface 114 (regardless of whether it was reflected off of the portion that includes first reflective material 122 or the portion that does not include first reflective material 122), the reflected radiation RR is projected to the second internal surface 116. With the illustrated geometry of optic 100, the reflected radiation RR will contact second internal surface 116 at an angle greater than the critical angle and, if left without second reflective material 124, would result in refraction through second interior surface 116 and out of optic 100 into the air below optic 100. However, as illustrated and described herein, second interior surface 116 includes second reflective material 124 along the entire length of second interior surface. Thus, any reflected radiation RR received from first interior surface 114 will be reflected back toward first interior surface 114. This second reflection from the second interior surface 116 will result in reflected radiation RR that will contact the portion of first interior surface 114 that does not include first reflective material 122 at an angle that is greater than the angle for total internal reflectance, allowing the reflected radiation to exit optic 100 toward exit lens 16.

Figure 4:
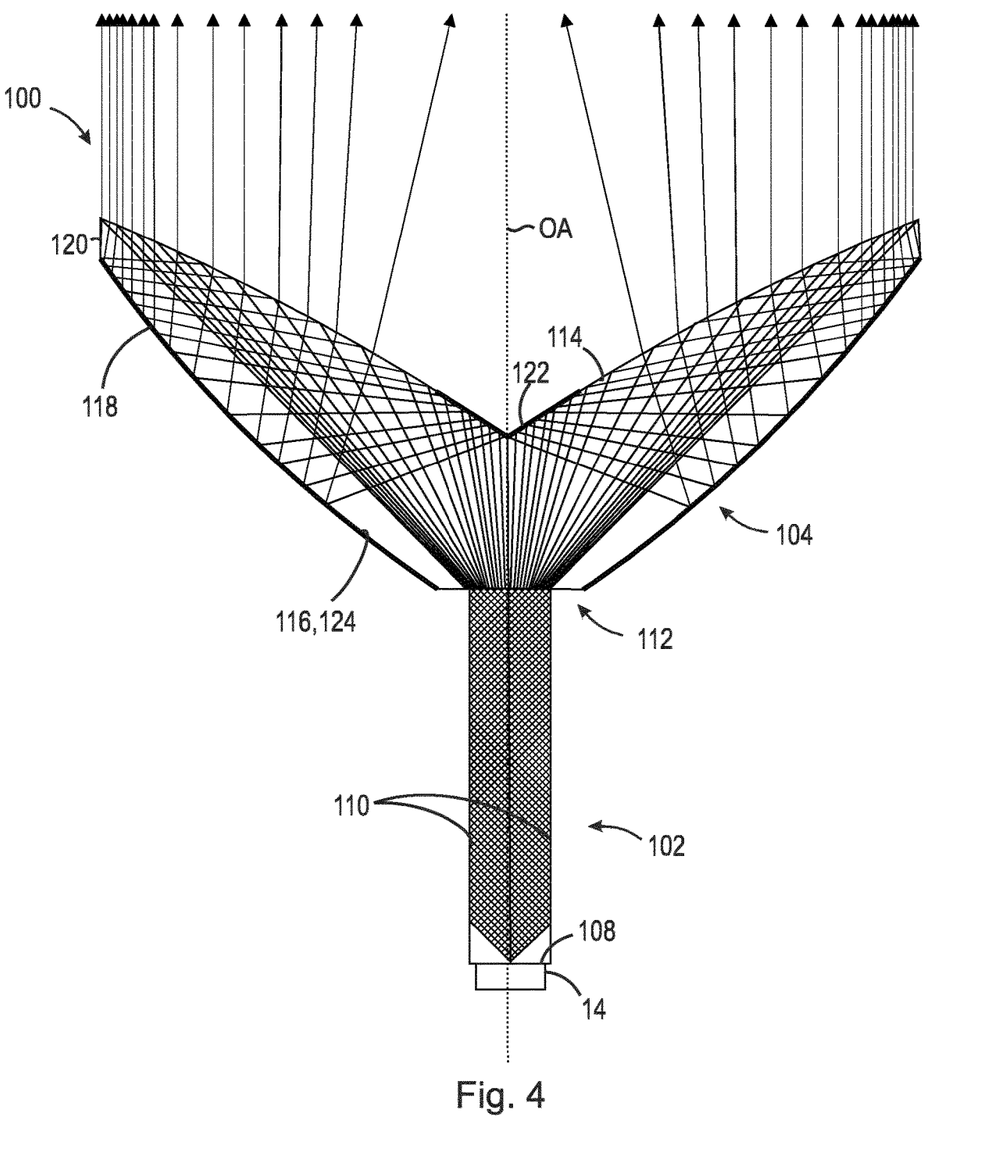
FIG. 4 is a cross-sectional view of the optic illustrated in FIG. 2 with ray tracing according to the present disclosure.

FIG. 4, illustrates a cross-sectional view of optic 100 with exemplary ray tracing of a plurality of rays of radiation. It should be appreciated that each arrow shown is intended to illustrate one sample path of a plurality of potential paths of electromagnetic radiation through optic 100 during operation. As shown, radiation source 14, e.g., an LED visible light source, is configured to produce electromagnetic radiation ER through bottom surface 108 of mixing pipe 102. In FIG. 4, it should be appreciated that the emission angle of the radiation source 14 is approximately 90 degrees, e.g., 45 degrees to either side of the optical axis OA. At the varied emission angle described, some rays proceed through the body of mixing pipe 102 without contacting one or more of the one or more interior pipe surfaces 110, while other rays contact multiple surfaces of the one or more interior pipe surfaces 110. The repeated contact and reflection of these rays off the one or more interior pipe surfaces 110 operate to mix the radiation produced by radiation source 14. For example, should radiation sources be a cluster of 4-colored LEDs (e.g., red, green, blue, and white), these colors would be substantially mixed to form the desired color chosen by the user once the respective rays reached the transition portion 112 of mixing pipe 102. After passing through the transition portion 112, all of the rays emitted contact first interior surface 114. Any rays that contact first interior surface 114 at an angle greater than or equal to the critical angle for total internal reflectance will be reflected to second interior surface 116, while any rays that contact first interior surface 114 at an angle less than the critical angle for total internal reflectance will reflect off of first reflective material 122 to second interior surface 116. Once reflected, all rays will contact second internal surface 116 at an angle less than the critical angle for total internal reflectance from second internal surface 116, and be reflected by second reflective material 124 back toward first internal surface 114. The reflected radiation RR, will contact the portion of first interior surface 114 that does not include first reflective material 122 at an angle less than the critical angle for total internal reflectance and pass through and/or refract through first interior surface 114 out of optic 100.

Figure 5A:
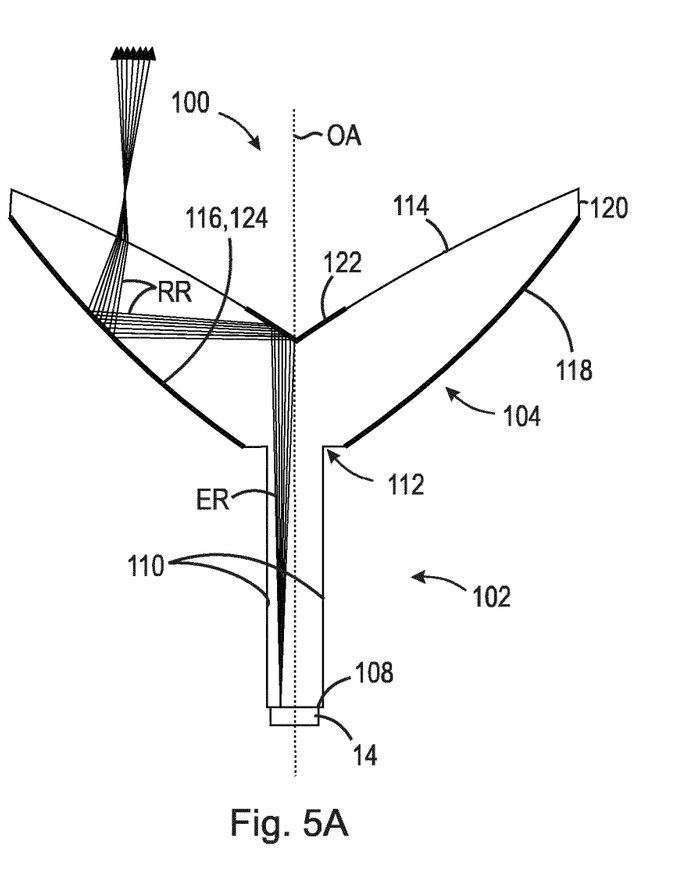
FIG. 5A is a cross-sectional view of the optic illustrated in FIG. 2 with ray tracing according to the present disclosure.
Figure 5B:
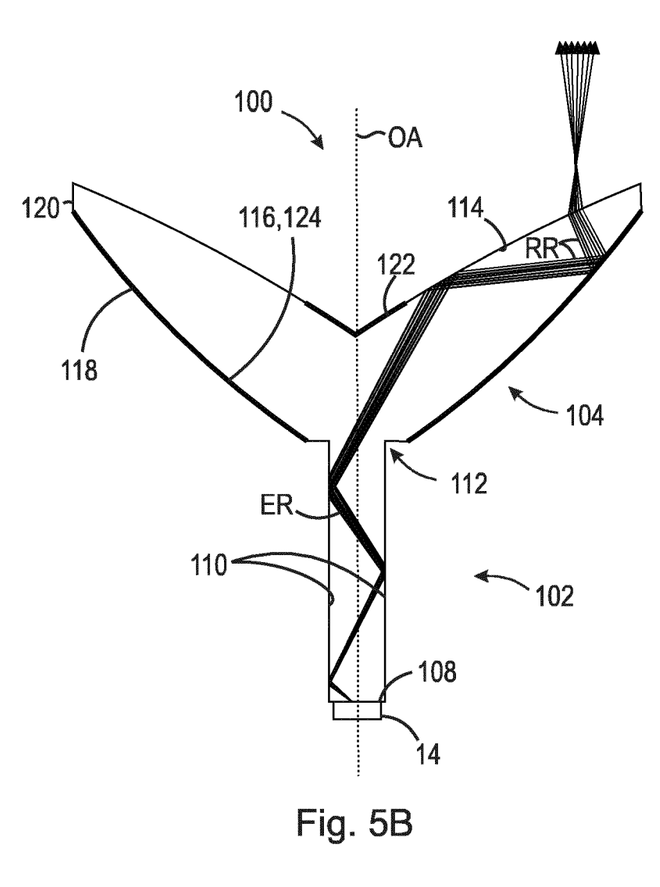
FIG. 5B is a cross-sectional view of the optic illustrated in FIG. 2 with ray tracing according to the present disclosure.

FIGS. 5A and 5B illustrate two potential ray paths (represented by lines with arrows), i.e., a first ray path where the rays of radiation contact first internal surface 114 at an angle less than the critical angle for total internal reflectance (see FIG. 5A), and a second ray path where the rays of radiation contact first internal surface 115 at an angle greater than the critical angle for total internal reflectance (see FIG. 5B). For example, FIG. 5A illustrates one potential ray path where electromagnetic radiation ER is emitted from radiation source 14 at a small angle, e.g., 1-10 degrees with respect to optical axis OA. As shown in FIG. 5A, the rays of radiation contact first internal surface 114 at an angle less than the critical angle for total internal reflectance. Without the aid of reflective material, e.g., first reflective material 122, these rays would refract and/or pass through first interior surface 114 and out of optic 100 without the shaping provided by reflectance off the second interior surface 116. Instead, the present disclosure provides that at least a portion of first interior surface 114, i.e., the portion proximate optical axis OA, is impregnated or integrated with a first reflective material 122, so that all of the rays that contact first interior surface 114 at an angle less than the critical angle for total internal reflectance will be reflected to second interior surface 116 for shaping before passing back through the first interior surface 114 and out of optic 100. In the example shown in FIG. 5B, another potential ray path is illustrated where electromagnetic radiation ER is emitted from radiation source 14 at a large angle, e.g., 11-45 degrees with respect to optical axis OA. As shown in FIG. 5B, the rays of radiation contact multiple surfaces of the one or more interior pipe surfaces 110 before passing through transition portion 112 and into the reflector body 104. The multiple reflections off of the one or more interior pipe surfaces 110 aids in mixing and homogenize the radiation produced by radiation sources 14. Once in the reflector body 104, the rays contact first internal surface 114 outside of the portion that includes first reflective material 122, and at an angle greater than the critical angle for total internal reflectance. Once reflected, the reflected radiation RR will contact second internal surface 116 at an angle less than the critical angle for total internal reflectance and will be reflected by the second reflective material 124 embedded second interior surface 116 back toward first interior surface 114. The reflected radiation RR will then refract and pass through first interior surface 114 and out of optic 100.

The optic 100 of the present disclosure provides several distinct advantages. First, by mixing the electromagnetic radiation ER within the mixing pipe 102, and providing further mixing and shaping through the reflectance provided between the first interior surface 114 and second interior surface 116 prior to allowing the radiation to exit the optic 100, the optic 100 will emit radiation with superior near field and far field mixing of the radiation with no hot spots or chromatic aberrations. Second, the optic 100 does not include a dedicated exit surface, e.g., the first interior surface 114 is both a reflective surface to aid in mixing and shaping, and also acts as an exit surface for the mixed and shaped light to exit the optic 100. By utilizing the first interior surface 114 for this dual purpose, more surface area can be utilized to emit the mixed and shaped light resulting in superior near field and far field mixing. Third, when used in a mixing and shaping system, e.g., a system that includes an optical housing 12 as well as a diffuser component 18 between the optic 100 and the exit lens 16 of the optical housing 12, the diffuser component 18 will further diffuse and smooth out the radiation emitted by optic 100 to further mitigate any undesirable shaping effects generated by the shape of mixing pipe 102. Finally, by producing the mixing pipe 102 and the reflector body 104 as one single integral article, the ability and cost of manufacturing optic 100 can be reduced.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An optic for mixing and shaping electromagnetic radiation comprising:
a mixing pipe optically coupled to one or more radiation sources, the one or more radiation sources configured to generate electromagnetic radiation; and
a reflector body integrally secured to the mixing pipe, the reflector body comprising a first planar internal surface configured to receive the electromagnetic radiation from the one or more radiation sources and reflect or refract the electromagnetic radiation as reflected electromagnetic radiation, the first planar internal surface being a conical planar shape formed within the reflector body, a portion of the first planar internal surface of the reflector body including a first reflective material, and a second planar internal surface configured to receive the reflected electromagnetic radiation and reflect or refract the reflected electromagnetic radiation, a portion of the second planar internal surface of the reflector body including a second reflective material;
wherein at least a portion of the reflected electromagnetic radiation is configured to exit the reflector body through the first planar internal surface.

2. The optic of claim 1, where the one or more radiation sources are Light Emitting Diodes (LEDs) or Color LEDs.

3. The optic of claim 1, wherein the reflector body is formed with a body material where the body material is polycarbonate.

4. The optic of claim 1, wherein the portion of the first planar internal surface that comprises the first reflective material includes a portion of the first planar internal surface proximate an imaginary optical axis arranged through the mixing pipe and the reflector body and substantially concentric with the reflector body.

5. The optic of claim 1, wherein the second reflective material is disposed along the entire second planar internal surface.

6. The optic of claim 1, wherein the mixing pipe has a cross-sectional profile, wherein the cross-sectional profile is selected from at least one of: square, circular, hexagonal, and octagonal.

7. The optic of claim 1, wherein the first and second planar internal surfaces of the reflector body are arranged entirely within the reflector body.

8. An optical system for mixing and shaping electromagnetic radiation comprising:
an optical housing;
a diffuser component;
an optic, the optic comprising:
a mixing pipe optically coupled to one or more radiation sources, the one or more radiation sources configured to generate electromagnetic radiation; and
a reflector body integrally secured to the mixing pipe, the reflector body comprising a first planar internal surface configured to receive the electromagnetic radiation from the one or more radiation sources and reflect or refract the electromagnetic radiation as reflected electromagnetic radiation, the first planar internal surface being a conical planar shape formed within the reflector body, a portion of the first planar internal surface of the reflector body including a first reflective material, and a second planar internal surface configured to receive the reflected electromagnetic radiation and reflect or refract the reflected electromagnetic radiation, a portion of the second planar internal surface of the reflector body including a second reflective material;
wherein at least a portion of the reflected electromagnetic radiation is configured to exit the reflector body through the first planar internal surface, and wherein the reflected electromagnetic radiation that exits the reflector body is configured to pass through the diffuser component into a surrounding environment.

9. The optical system of claim 8, where the one or more radiation sources are Light Emitting Diodes (LEDs) or Color LEDs.

10. The optical system of claim 8, wherein the reflector body is formed with a body material where the body material is polycarbonate.

11. The optical system of claim 8, wherein the portion of the first planar internal surface that comprises the first reflective material includes a portion of the first planar internal surface proximate an imaginary optical axis arranged through the mixing pipe and the reflector body and substantially concentric with the reflector body.

12. The optical system of claim 8, wherein the second reflective material is disposed along the entire second planar internal surface.

13. The optical system of claim 8, wherein the mixing pipe has a cross-sectional profile, wherein the cross-sectional profile is selected from at least one of: square, circular, hexagonal, and octagonal.

* * * * *